United States Patent [19]

Sakurai

[11] Patent Number: 5,137,234
[45] Date of Patent: Aug. 11, 1992

[54] SIDESTICK CONTROLLERS

[76] Inventor: Seiya Sakurai, c/o The Boeing Company, P.O. Box 3707, M.S.-6Y-25, Seattle, Wash. 98124

[21] Appl. No.: 607,981

[22] Filed: Oct. 31, 1990

[51] Int. Cl.⁵ .......................................... B64C 13/06
[52] U.S. Cl. .................................. 244/234; 244/237; 414/5; 74/518; 74/480 R
[58] Field of Search ............... 244/223, 234, 237; 414/5; 74/518

[56] References Cited

U.S. PATENT DOCUMENTS

| | | | |
|---|---|---|---|
| 2,441,212 | 5/1948 | Schenk | 74/479 |
| 2,618,447 | 11/1952 | Lecarme | 244/231 |
| 2,661,169 | 12/1953 | Ashkenas | 244/76 C |
| 2,796,774 | 6/1957 | Peed, Jr. | 74/522 |
| 2,881,631 | 4/1959 | Riccius | 74/470 |
| 3,011,739 | 12/1961 | Boyce et al. | 244/237 |
| 3,028,126 | 4/1962 | Holleman | 244/236 |
| 3,119,583 | 1/1964 | Gibson | 244/223 |
| 3,295,386 | 1/1962 | Menefee et al. | 244/234 |
| 3,303,714 | 2/1967 | Fontaine | 244/223 |
| 3,523,665 | 8/1970 | Laynor, Jr. et al. | 244/237 |
| 3,726,497 | 4/1973 | Gannett et al. | 244/234 |
| 3,765,263 | 10/1973 | Buscher et al. | 74/491 |
| 3,897,695 | 8/1975 | Rostad | 74/518 |
| 4,012,014 | 3/1977 | Marshall | 244/234 |
| 4,069,720 | 1/1978 | Thor | 74/471 R |
| 4,212,367 | 7/1980 | Kawaguchi | 74/491 |
| 4,441,676 | 4/1984 | Roowarth | 244/234 |
| 4,477,043 | 10/1984 | Repperger | 244/223 |
| 4,574,651 | 3/1986 | Nordstrom | 244/234 |
| 4,632,341 | 12/1986 | Repperger et al. | 244/234 |

Primary Examiner—Joseph F. Peters, Jr.
Assistant Examiner—Linda L. Palomar
Attorney, Agent, or Firm—Hughes & Multer

[57] ABSTRACT

Asymmetrical mechanical linkages for sidestick roll controllers located at the pilot and copilot stations of aircraft and other vehicles with fly-by-wire control systems. The asymmetrical character of the linkage reduces the level of exertion required to rotatably displace the sidestick in the outboard direction and, as an important consequence, significantly reduces pilot fatigue.

4 Claims, 4 Drawing Sheets

PILOT FEEL (SYMMETRICAL)

PILOT FEEL (ASYMMETRICAL)

ND-234

SIDESTICK CONTROLLERS

TECHNICAL FIELD OF THE INVENTION

The present invention relates to sidestick controllers and, more particularly, to novel, improved sidestick controllers which have an asymmetric linkage for reducing pilot fatigue.

BACKGROUND OF THE INVENTION

Advanced military and proposed commercial aircraft, shuttle craft, and other extraterrestrial craft have what are known as fly-by-wire control systems. Manipulation of the control at a pilot's station results in the generation of an appropriate electrical control signal. This signal is transmitted to an onboard computer. The computer outputs a signal for operating a typically hydraulic control surface actuator to effect the wanted displacement of the involved control surface.

A sidestick controller is one type of device that is employed at pilot stations in craft equipped with fly-by-wire control systems. Heretofore available sidestick controllers have a control stick mounted for pivotable movement in the inboard and outboard directions about a fore-and-aft axis paralleling the longitudinal axis of the craft in which the control stick is installed. By rotating his hand in a clockwise direction, a pilot can pivot the sidestick controller in the same direction. Acting through a mechanical linkage of the parallelogram type, this causes an associated transducer to produce an electrical signal which results in the craft rolling to the right about its longitudinal axis. The degree of roll and roll rate are determined by the magnitude and rate of displacement of the sidestick. Similarly, by rotating his hand in a counterclockwise direction, the pilot can cause the craft to roll to the left at the wanted rate and through the wanted angle.

In craft with two pilot stations, a sidestick controller is located at each station; and the controllers are mechanically connected. This allows the roll of the craft to be controlled from either of the pilot stations.

As heretofore designed, the sidestick linkage was so constructed that the force required to rotate the sidestick in the outboard direction (counterclockwise for the pilot and clockwise for the copilot) and in the inboard direction were equal. Because of the anatomical construction of the human arm, however, greater effort is required to displace the sidestick through a given arc in the outboard direction than is required to rotate that control element through the same arc in the inboard direction. As a result, pilot forearm, wrist, and hand fatigue become a real concern.

SUMMARY OF THE INVENTION

There have now been invented and disclosed herein certain new and novel sidestick control systems which address this problem of pilot fatigue and eliminate that fatigue to a significant extent, even in circumstances in which fatigue is most apt to be a problem.

Generally speaking, this novel and important result is obtained by substituting for the heretofore designed sidestick linkage with its requirement for equal applications of force to generate equal displacements in the outboard and inboard directions what is referred to herein as an asymmetric roll feed linkage. This linkage has inboard and outboard moment arms of different lengths rather than the equal movement arms of the heretofore designed symmetrical roll feed linkage. Specifically, the inboard moment arm is longer than the outboard moment arm in the asymmetrical linkages disclosed herein. As a consequence, the mechanical advantage of the sidestick as it is rotated in the outboard direction from its neutral position is greater than the advantage gained when the sidestick is rotated inwardly from the neutral position. This translates into a lower level of muscular effort being required and reduced pilot fatigue.

OBJECTS OF THE INVENTION

From the foregoing, it will be apparent to the reader that one important and primary object of the present invention resides in the- provision of novel, improved control systems of the sidestick type.

Another, also important and related object of the invention resides in the provision of novel sidestick control systems which have the capacity to reduce pilot fatigue.

Still another important object of the invention is the provision of sidestick control systems in which the goal identified in the preceding paragraph is realized in a simple, yet effective manner.

Other important objects and features and additional advantages of the invention will be apparent to the reader from the foregoing and the appended claims and as the ensuing detailed description proceeds in conjunction with the accompanying drawing.

DETAILED DESCRIPTION OF THE INVENTION

Figure 1:
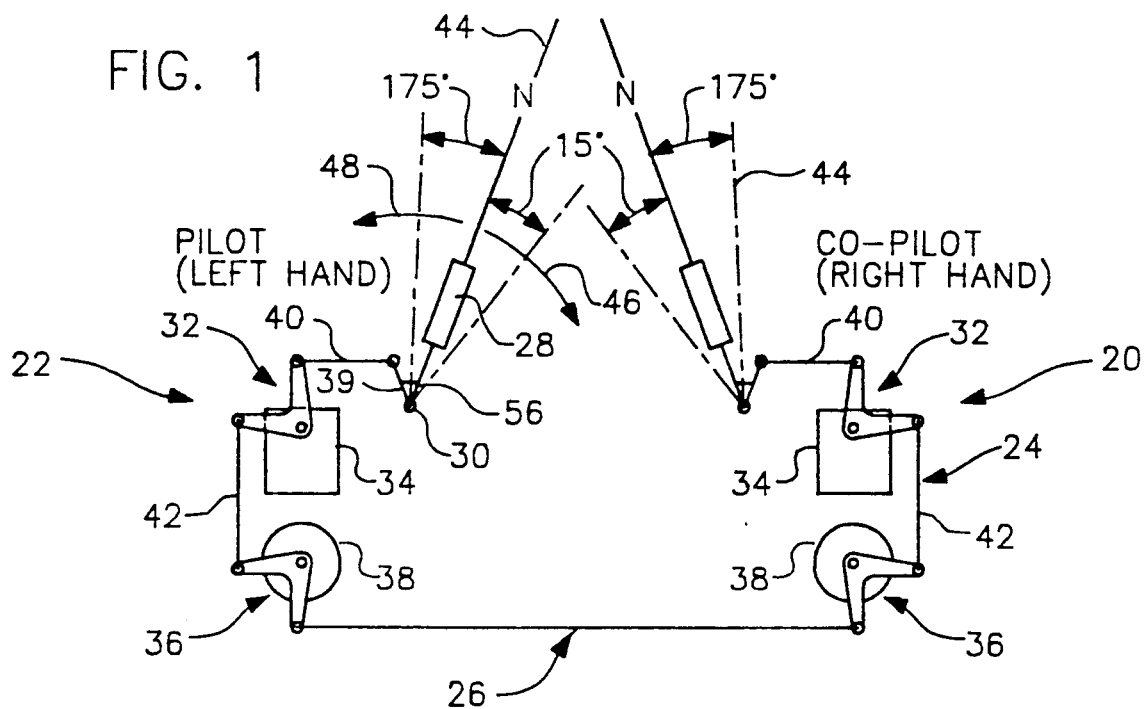
FIG. 1 is a diagrammatic representation of a control system which has sidestick controllers with asymmetrical feel at a pilot station and at a copilot station in accord with the principles of the present invention and a mechanical link between the two sidestick controllers.

Referring now to the drawing, FIG. 1 schematically depicts a roll control system 20 of the sidestick type. This system includes a pilot station 22 and a copilot station 24 mechanically linked by a tie rod assembly 26; and it is constructed in accord with, and embodies, the principles of the present invention.

The control system components in pilot station 22 and in copilot station 24 are for the most part the same although related to a large extent in mirror image relationship. Consequently, only those components in the pilot station will be described in detail.

The control components in pilot station 22 include a grip assembly 28 mounted for pivotable movement about a pivot axis 30, a crank 32 connected to a feel unit 34, and a second crank 36 connected to a rotary variable differential transformer (RVDT) 38. The axes of rotation of the two cranks and the grip assembly are parallel.

Grip assembly 28 is mechanically connected to feel unit crank 32 by a crank or radius arm 39, which rotates with the grip assembly, and a mechanical link 40. A second link 42 mechanically connects feel unit crank 32 to RVDT crank 36.

Displacement of grip assembly 28 in a clockwise, inboard direction from neutral axis 44 as indicated by arrow 46 in FIG. 1 causes the craft controlled by system 20 to roll to the right. Conversely, displacement of the grip assembly in the opposite, counterclockwise, outboard direction indicated by arrow 48 causes the craft to roll to the left. Feeding back through crank 32 and link 40, feel unit 34 imparts a resistive force to these displacements of grip assembly 28. This enables the pilot to precisely control the displacement of the grip assembly. The feel unit also restores grip assembly 28 to the neutral position 44 and keeps it in that position, absent a pilot-exerted, displacing force.

As will be apparent to the reader from FIG. 1, clockwise or counterclockwise displacements of grip assembly 28 produce complementary pivotable or rotary movements of RVDT crank 36. This clockwise or counterclockwise displacement of crank 36 is converted by RVDT 38 into an electrical control signal indicative of the rate and direction of displacement of crank 36 and the direction in which it is displaced. This control signal is transmitted to an onboard computer (not shown) and employed by the latter to generate a control signal for the roll surfaces of the craft in which system 20 is installed.

As thus far described, control system 20 is generally like one which has heretofore been proposed. In the prior art system, schematically depicted in part in FIG. 2 and identified by reference character 50, the various components of the control system in the pilot station 22 are so related that the resistance to displacement felt by the pilot in both the clockwise and counterclockwise directions 46 and 48 is symmetrical. That is, as the pilot displaces grip assembly 28 in the clockwise or inboard direction 46 to cause the craft to roll to the right, the force required to displace the grip assembly increases linearly with displacement (see FIG. 3). The same is true to an equal extent when the grip assembly is displaced in the counterclockwise or outboard direction 48 to cause the craft to roll to the left. Thus, the inboard and outboard forceversus-displacement curves 52 and 54 shown in FIG. 3 are symmetrical.

Pilots (and copilots) have found that this prior art arrangement tires the forearm, wrist, and hand because the muscles brought into play in displacing grip assembly 28 in the outboard direction are weaker than those utilized to displace it in the inboard direction. Tiring is practically noticeable in circumstances such as those requiring repeated displacements of appreciable magnitude.

Figure 5:
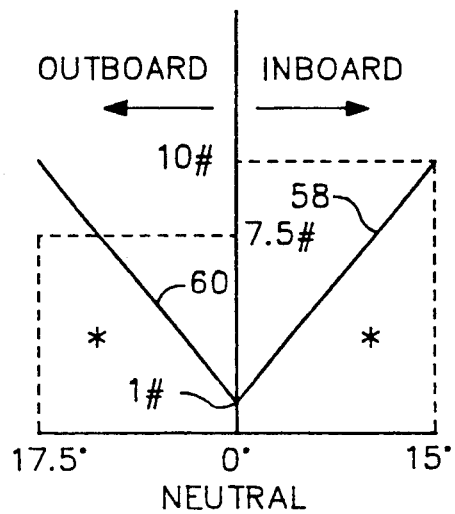
FIG. 5 is a force versus displacement diagram for the sidestick controller of FIG. 4.
Figure 4:
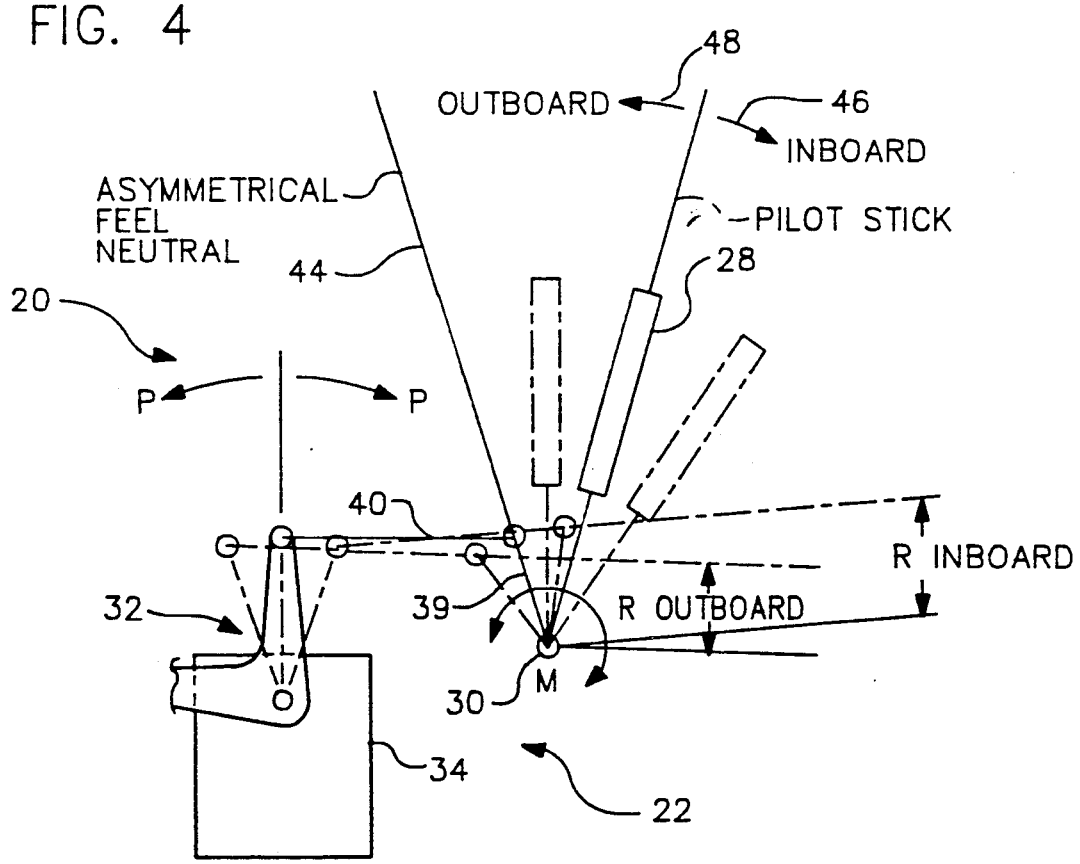
FIG. 4 is a view, similar to FIG. 2, of an asymmetric sidestick controller which embodies the principles of the present invention and is capable of reducing pilot fatigue by virtue of its being so designed and constructed that less pilot effort is required to displace the sidestick controller in the outboard direction than is needed to displace that controller in the inboard direction.

Referring now to FIGS. 4 and 5, the novel roll control system 20 disclosed herein differs from its prior art counterpart in that it employs an asymmetrical rather than symmetrical pilot feel. Specifically, the components in the pilot station 22 of control system 20 are so related that the force required to displace grip assembly 28 in the inboard, clockwise direction 46 essentially duplicates that required in the prior art arrangement 50. However, a lesser force is all that is needed to cause the craft to roll in the opposite, outboard, counterclockwise direction 48. Thus, in the illustrated exemplary system, and is shown in FIG. 5, a ten pound force may be required to generate maximum roll in the inboard direction whereas only a 7.5 pound force is needed to produce maximum roll in the outboard direction. Because the work required to effect these respective maximum degrees of roll is the same, as indicated by the asterisks in FIG. 5, the displacement of the grip assembly 28 required to produce maximum roll is greater in the case of roll in the outboard direction. However, this is a more-than-acceptable tradeoff in view of the considerable reduction in force that is required.

Figure 2:
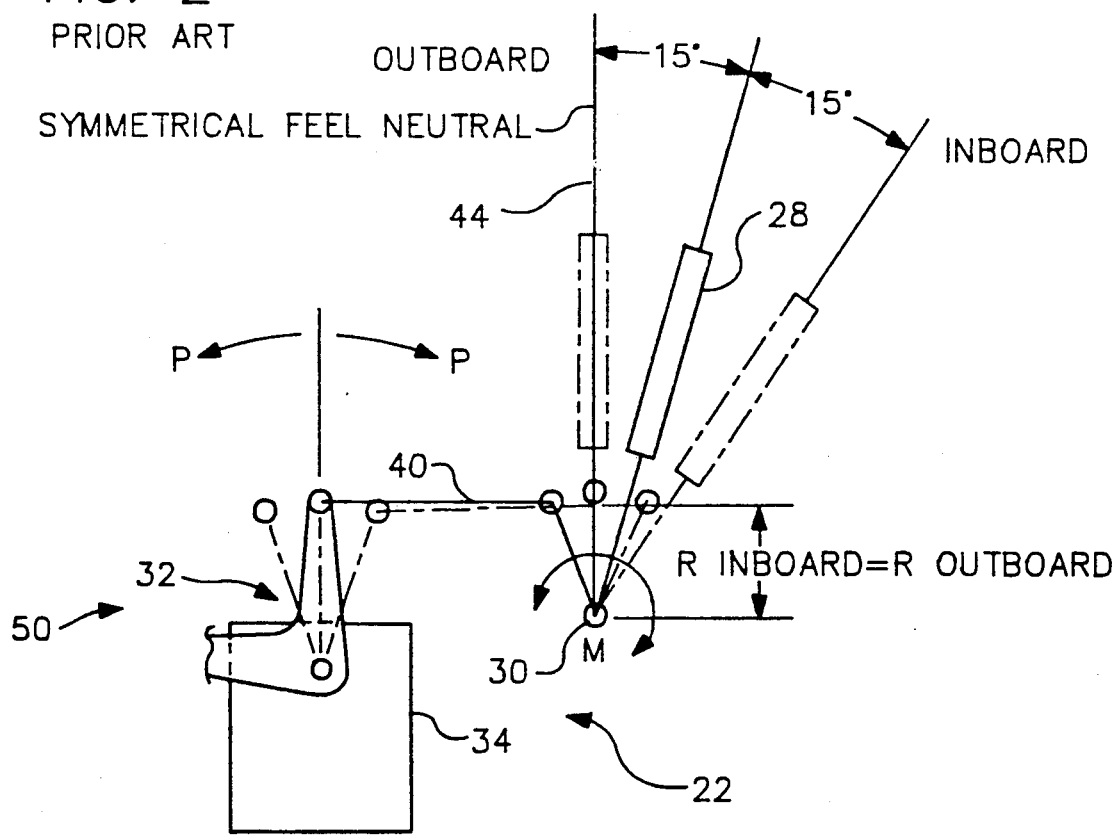
FIG. 2 is a fragment of FIG. 1, drawn to an enlarged scale, and showing in more detail: the sidestick controller at the pilot station in a prior art control system, a feel unit to which the sidestick controller is mechanically linked, the linkage, and the maximum inboard and outboard displacement of the sidestick controller from its neutral position.
Figure 3:
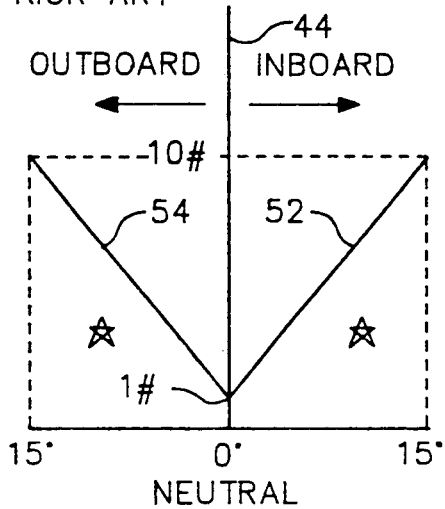
FIG. 3 is a graph showing the symmetrical relationship between displacements in the inboard and outboard directions of sidestick controllers as depicted in FIG. 1 and the forces required to effect those displacements.

This novel, improved, asymmetrical force relationship is obtained in control system 20 in an elegant and simple fashion by changing the length of that link 40 mechanically connecting grip assembly crank 39 and feel unit crank 32 as can be seen by comparing FIG. 4 (the present invention) and FIG. 2 (the prior art). This shifts the orientation of neutral axis 44. The result is the wanted reduction in the effort required to displace the grip assembly in the counterclockwise, outboard direction 48.

Instead of the near parallelogram four-bar linkage shown in FIG. 2, the present invention has the decidedly trapezoidal for linkage illustrated in FIG. 4. That reduces the outboard versus inboard "effective radius". This increases the mechanical advantage between grip assembly 28 and the crank or radius arm 39 rigidly fixed to the pivot end 56 of grip assembly 28 as the radius arm is displaced in the outboard direction 48.

Typically, a system employing the principles of the present invention is so constructed that the travel of grip assembly 28 in the outboard direction will be on the order of 2°-3° greater than the maximum displacement of the grip assembly in the inboard direction. That will make the force required to effect maximum displacement of the grip assembly in the outboard direction 25°-30° lower than the force required for maximum displacement in the inboard direction (see inboard and outboard force versus displacement curves 58 and 60 in FIG. 5). The feel gradient or force-versus-displacement curve 60 is not quite linear. However, the departure from strict linearity is not great enough to pose any problems in controlling the roll of the craft in which the system of the present invention is installed.

Figure 6:
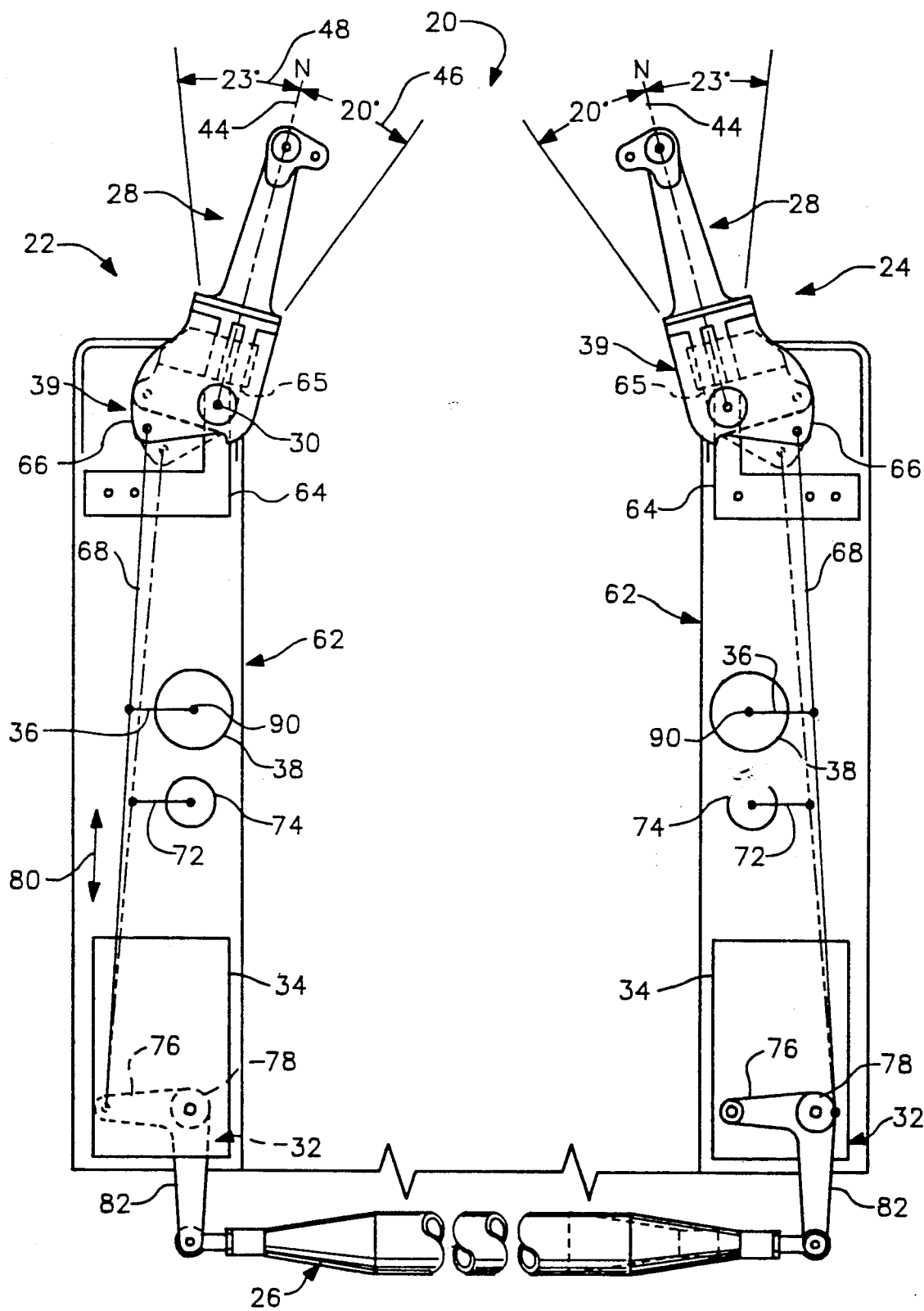
FIG. 6 is a rear and more detailed view of a system as shown in FIG. 1 in which the sidestick controllers at a pilot station and a copilot station are mechanically linked and employ novel, improved, asymmetric feel controllers of the character depicted in FIG. 4.

Referring still to the drawing, FIG. 6 depicts in more detail a control system of the type shown schematically in FIG. 1 and identified by reference character 20. Again, only the pilot station 22 will be described because of the similarity between it and copilot station 24.

Pilot station 22 includes a vertically extending structural assembly 62. Grip assembly 28 is supported from the structural assembly for inboard and outboard pivotable displacement about pivot axis 30 by crank 39. The crank is supported from a bell crank bar 64 and has an arm 65 rigidly fixed to grip assembly 28 for rotation therewith.

A second, integral arm 66 of crank 39 is connected by roll control rod assembly 68 and crank 36 to the roll signal generating RVDT 38. A crank 72 also pivotably connected to rod assembly 68 can be employed to connect control rod 68 to an optional viscous damper 74 so that grip assembly 28 will not vibrate.

At its lower end, control rod assembly 68 is pivotably connected to one arm 76 of feel unit crank 32. This crank rotates with the output 78 from feel 0 unit 34. Consequently, as grip assembly 28 is displaced in the inboard direction 46 or outboard direction 48, control rod 68 respectively moves up and down as indicated by arrow 80 in FIG. 6. Crank 32 is rotatably displaced in the same direction as grip assembly 28, and feel unit 34 consequentially imparts the wanted resistance to the displacement.

Feel unit crank 32 has a second, integral, depending arm 82. This arm is pivotably connected to the left-hand end of tie rod assembly 22. The tie rod assembly is similarly connected, at its opposite, right-hand end, to the feel unit crank 32 in copilot station 24. This facilitates rapid and smooth transfer of control between the pilot and copilot.

Figure 7:
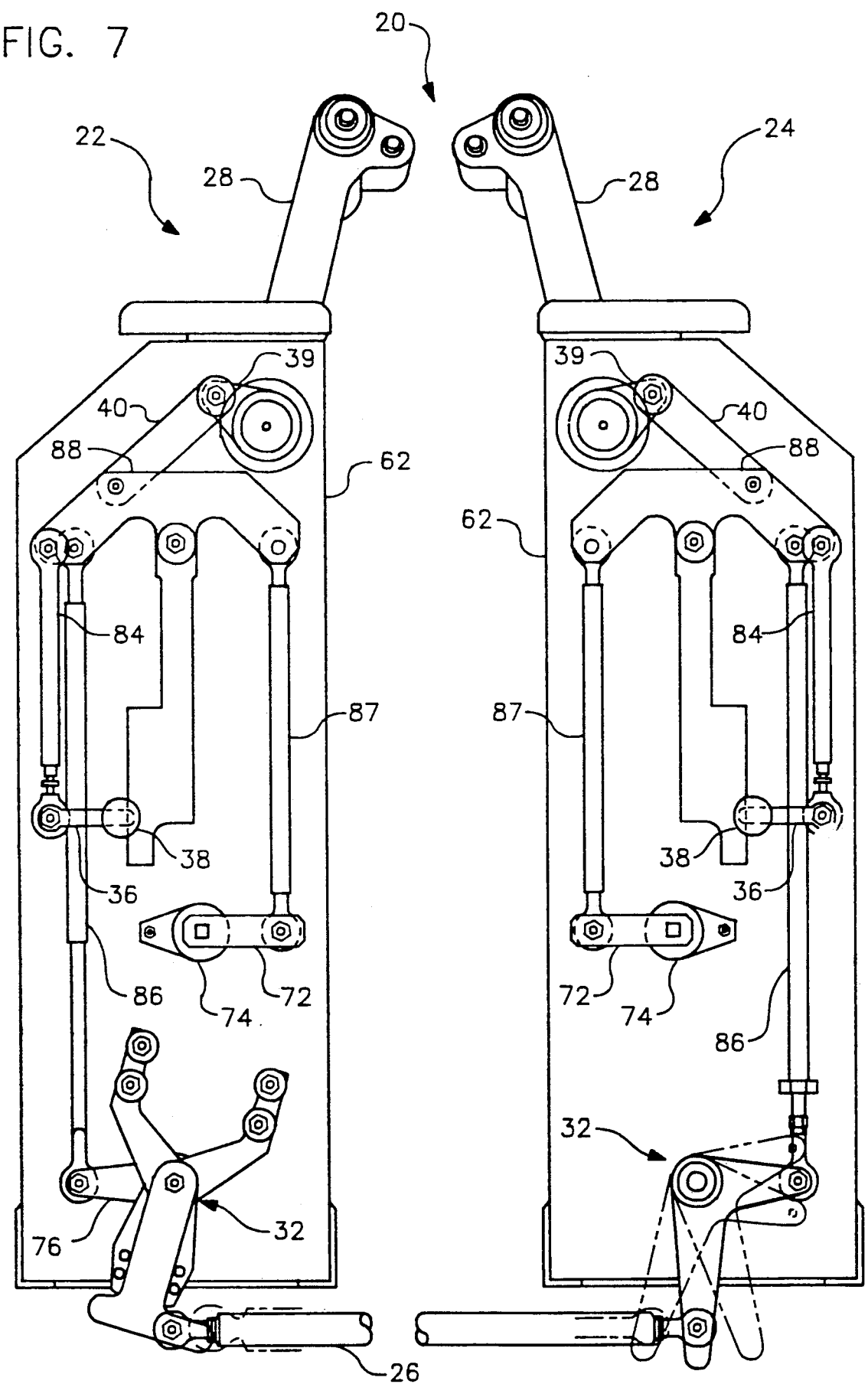
FIG. 7 is a view similar to FIG. 6 but of another embodiment of the invention and with certain components removed so that the details of the mechanical linkage between the sidestick controllers at the pilot and copilot stations can more readily be seen.

In actual practice, a tie rod assembly 68 as shown schematically in FIG. 6 might typically have a somewhat different arrangement of components and include a RVDT tie rod 84, a separate feel unit tie rod 86, and a separate viscous damper tie rod 87 (see FIG. 7). At their upper ends, all three tie rods 84, 86, and 87 are pivotably connected to the arms of a control rod crank 88. The lower end of tie rod 84 is similarly connected to the crank 36 which rotates with the output 90 of RVDT 38. Likewise, the lower end of tie rod 86 is pivotably connected to the arm 76 of feel unit crank 36. The lower end of tie rod 87 is pivotably connected to the end of viscous damper crank 72.

Also shown in detail in FIG. 7 are a more representative version of the crank 39 which rotates with grip assembly 28 about pivot axis 30 and the link 40 which, in the FIG. 7 embodiment of the invention, connects grip assembly crank 39 to roll control crank assembly 88.

The actual control systems depicted in FIGS. 6 and 7 are designed to afford pitch as well as roll control, and certain components employed in pitch control appear in those figures. Those components and the manner in which they are employed for pitch control as well as the components connecting the pilot and copilot stations 22 and 24 are not part of the present invention and will accordingly not be described herein.

The invention may be embodied in forms other than those disclosed above without departing from the spirit or essential characteristics of the invention. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. A control system which comprises:
    (a) a sidestick controller which is pivotably displaceable in a first, inboard and a second, outboard direction from a neutral position and is effective to cause the craft in which the system is installed to roll to the left and to the right as the controller is pivotabley displaced in one and the other of said directions;
    (b) transducer means for converting the aforesaid pivotable displacements of the sidestick controller into signals indicative of a wanted direction, magnitude, and rate of roll; and
    (c) a mechanical linkage means so connecting said controller to said transducer that the level of muscular exertion required to pivotably displace said controller in the outboard direction is lower than the level required to pivotably displace that sidestick in the inboard direction, said mechanical linkage means including a trapezoidal, four-bar linkage which increases the mechanical advantage afforded a pilot during the outboard pivotable displacement of the controller from its neutral position.

2. A control system as defined in claim 1 in which the mechanical linkage means has components so related that the force required to rotatably displace the controller in the outboard direction is in the range of 25–30 percent lower than the force required to rotatably displace it in the inboard direction.

3. A control system as defined in claim 1 in which the linkage includes a first crank rotatable about a first fixed axis; a second crank rotatable with the sidestick controller about a second, fixed axis paralleling the fist axis; and a rigid link pivotably connected at one end to the outboard end of the first crank, the opposite end of the link being pivotably connected to an outboard end of an arm of the second crank.

4. A control system as defined in claim 1 which includes a feel unit operatively connected to said sidestick controller by said linkage means to provide resistance to the inboard and outboard displacements of the controller.

* * * * *